(12) United States Patent
Duan (10) Patent No.: US 11,003,926 B2
(45) Date of Patent: May 11, 2021

(54) METHOD AND APPARATUS FOR RECOGNIZING BOUNDARY OF TRAFFIC SIGN

(71) Applicant: Baidu Online Network Technology (Beijing) Co., Ltd., Beijing (CN)

(72) Inventor: Xu Duan, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/713,297

(22) Filed: Dec. 13, 2019

(65) Prior Publication Data

US 2020/0372268 A1 Nov. 26, 2020

(30) Foreign Application Priority Data

May 23, 2019 (CN) .......................... 201910435230.3

(51) Int. Cl.
*G06K 9/00* (2006.01)
*G06T 7/12* (2017.01)
*G06K 9/62* (2006.01)

(52) U.S. Cl.
CPC ....... *G06K 9/00818* (2013.01); *G06K 9/6215* (2013.01); *G06K 9/6257* (2013.01); *G06K 9/6262* (2013.01); *G06T 7/12* (2017.01); *G06T 2207/20081* (2013.01); *G06T 2207/30252* (2013.01)

(58) Field of Classification Search
CPC ............. G06K 9/00818; G06K 9/6215; G06K 9/6257; G06K 9/6262; G06T 7/12; G06T 2207/20081; G06T 2207/30252

USPC .......................................................... 382/103
See application file for complete search history.

(56) References Cited

U.S. PATENT DOCUMENTS

| | | | |
|---|---|---|---|
| 9,898,825 B2 * | 2/2018 | Rivet-Sabourin | G06T 7/149 |
| 10,206,646 B2 * | 2/2019 | Gulsun | A61B 6/5217 |
| 10,403,037 B1 * | 9/2019 | Boardman | G06T 7/60 |
| 10,545,029 B2 * | 1/2020 | Yang | G01C 21/32 |
| 10,551,845 B1 * | 2/2020 | Kim | G05D 1/0221 |
| 2006/0104516 A1 | 5/2006 | Lee | |

(Continued)

FOREIGN PATENT DOCUMENTS

| CN | 105631880 A | 6/2016 |
|---|---|---|
| CN | 108428248 A | 8/2018 |

(Continued)

*Primary Examiner* — Jonathan S Lee
(74) *Attorney, Agent, or Firm* — Nixon Peabody LLP (57) ABSTRACT

A method and an apparatus for recognizing a boundary of a traffic sign are provided. The method includes: acquiring at least one initial boundary point of a traffic sign in a to-be-processed image, the initial boundary point being used to mark a boundary of the traffic sign; dividing the to-be-processed image into at least one image segmentation area based on the at least one initial boundary point, the image segmentation area including at least one initial boundary point; importing, for an image segmentation area in the at least one image segmentation area, the image segmentation area into a pre-trained traffic sign boundary point recognition model to obtain an update boundary point corresponding to the image segmentation area; and determining a boundary point of the traffic sign based on all the update boundary point corresponding to the image segmentation area.

13 Claims, 6 Drawing Sheets

(56) References Cited

U.S. PATENT DOCUMENTS

2013/0058534 A1  3/2013  Zobel
2015/0238148 A1  8/2015  Georgescu

FOREIGN PATENT DOCUMENTS

CN  108509954 A  9/2018
CN  109117831 A  1/2019
KR  101873576 B1  7/2018

* cited by examiner

METHOD AND APPARATUS FOR RECOGNIZING BOUNDARY OF TRAFFIC SIGN

CROSS-REFERENCE TO RELATED APPLICATIONS

This application claims priority to Chinese Patent Application No. 201910435230.3, filed on May 23, 2019, titled "Method and Apparatus for Recognizing Boundary of Traffic Sign," which is hereby incorporated by reference in its entirety.

TECHNICAL FIELD

Embodiments of the present disclosure relate to the field of image processing technologies, specifically to a method and apparatus for recognizing a boundary of a traffic sign.

BACKGROUND

With the rapid development of smart cars and autonomous driving technology, the detection and recognition of traffic signs have become an important part of safe driving. A smart car may acquire an image including a traffic sign, recognize the traffic sign from the image, and further implement autonomous driving of the smart car according to the traffic sign. However, the recognition of the traffic sign is not accurate enough in the existing technology.

SUMMARY

The embodiments of the present disclosure provide a method and an apparatus for recognizing a boundary of a traffic sign board.

In a first aspect, the embodiments of the disclosure provides a method for recognizing a boundary of a traffic sign board, which includes: acquiring at least one initial boundary point of the traffic sign in a to-be-processed image, the initial boundary point being used to mark the boundary of the traffic sign; dividing the to-be-processed image into at least one image segmentation area based on the at least one initial boundary point, the image segmentation area including the at least one initial boundary point; importing, for an image segmentation area in the at least one image segmentation area, the image segmentation area into a pre-trained traffic sign boundary point recognition model to obtain an update boundary point corresponding to the image segmentation area, the traffic sign boundary point recognition model being configured to obtain the update boundary point of the traffic sign based on the initial boundary point; and determining the boundary point of the traffic sign based on all the update boundary point corresponding to the image segmentation area.

In some embodiments, the traffic sign boundary point recognition model is obtained by following training steps: acquiring a plurality of sample images and a sample update boundary point of a traffic sign corresponding to each sample image of the plurality of sample images, where the sample image includes a traffic sign image segmentation area and a sample initial boundary point corresponding to the traffic sign image segmentation area; and using each sample image of the plurality of sample images as an input, and using the sample update boundary point corresponding to each sample image of the plurality of sample images as an output, training to obtain the traffic sign boundary point recognition model.

In some embodiments, the using each sample image of the plurality of sample images as an input, and using the sample update boundary point corresponding to each sample image of the plurality of sample images as an output, training to obtain the traffic sign boundary point recognition model, includes: performing the following training steps: inputting sequentially the traffic sign image segmentation area and the sample initial boundary point of each sample image of the plurality of sample images into an initial traffic sign boundary point recognition model, to obtain a prediction update boundary point corresponding to each sample image of the plurality of sample images, comparing the prediction update boundary point corresponding to each sample image of the plurality of sample images with the sample update boundary point corresponding to the sample image, to obtain a prediction accuracy rate of the initial traffic sign boundary point recognition model, determining whether the prediction accuracy rate is greater than a preset accuracy rate threshold, and if the prediction accuracy rate is greater than the preset accuracy rate threshold, determining the initial traffic sign boundary point recognition model as a trained traffic sign boundary point recognition model.

In some embodiments, the using each sample image of the plurality of sample images as an input, and using the sample update boundary point corresponding to each sample image of the plurality of sample images as an output, training to obtain the traffic sign boundary point recognition model, includes: adjusting a parameter of the initial traffic sign boundary point recognition model, in response to the prediction accuracy rate being not greater than the preset accuracy rate threshold, and continuing to perform the training steps.

In some embodiments, the adjusting a parameter of the initial traffic sign boundary point recognition model, includes: calculating a loss function value of the initial traffic sign boundary point recognition model based on the prediction update boundary point and the sample update boundary point; and adjusting the parameter of the initial traffic sign boundary point recognition model by the loss function value.

In some embodiments, the sample update boundary point is acquired by following steps: selecting a set number of initial random points from the sample image; selecting at least one update random point belonging to the traffic sign image segmentation area from the initial random points; and calculating a distance between an update random point in the at least one update random point and the sample initial boundary point, and setting an update random point having the smallest distance as the sample update boundary point.

In a second aspect, the embodiments of the disclosure provides an apparatus for recognizing a boundary of a traffic sign, the apparatus, which includes: an initial boundary point acquisition unit, configured to acquire at least one initial boundary point of the traffic sign in a to-be-processed image, the initial boundary point being used to mark the boundary of the traffic sign; an image segmentation area dividing unit, configured to divide the to-be-processed image into at least one image segmentation area based on the at least one initial boundary point, the image segmentation area including at least one initial boundary point; a traffic sign recognition unit, configured to import, for an image segmentation area in the at least one image segmentation area, the image segmentation area into a pre-trained traffic sign boundary point recognition model to obtain an update boundary point corresponding to the image segmentation area, the traffic sign boundary point recognition model being configured to obtain the update boundary point of the traffic sign based on the initial boundary point; and a boundary point determining unit, configured to determine the boundary point of the traffic sign based on all the update boundary point corresponding to the image segmentation area.

In some embodiments, the apparatus includes a traffic sign boundary point recognition model training unit, configured to train the traffic sign boundary point recognition model, and the traffic sign boundary point recognition model training unit includes: a sample acquisition subunit, configured to acquire a plurality of sample images and a sample update boundary point of a traffic sign corresponding to each sample image of the plurality of sample images, where the sample image includes a traffic sign image segmentation area and a sample initial boundary point corresponding to the traffic sign image segmentation area; and a traffic sign boundary point recognition model training subunit, configured to train to obtain the traffic sign boundary point recognition model, using each sample image of the plurality of sample images as an input and using the sample update boundary point corresponding to each sample image of the plurality of sample images as an output.

In some embodiments, the traffic sign boundary point recognition model training subunit includes: a traffic sign boundary point recognition model training module, configured to input sequentially the traffic sign image segmentation area and the sample initial boundary point of each sample image of the plurality of sample images into an initial traffic sign boundary point recognition model, to obtain a prediction update boundary point corresponding to each sample image of the plurality of sample images, compare the prediction update boundary point corresponding to each sample image of the plurality of sample images with the sample update boundary point corresponding to the sample image, to obtain a prediction accuracy rate of the initial traffic sign boundary point recognition model, determine whether the prediction accuracy rate is greater than a preset accuracy rate threshold, and if the prediction accuracy rate is greater than the preset accuracy rate threshold, determine the initial traffic sign boundary point recognition model as a trained traffic sign boundary point recognition model.

In some embodiments, the traffic sign boundary point recognition model training subunit includes a parameter adjusting module, configured to adjust a parameter of the initial traffic sign boundary point recognition model, in response to the prediction accuracy rate being not greater than the preset accuracy rate threshold, and return to the traffic sign boundary point recognition model training module.

In some embodiments, the parameter adjusting module includes: a loss function value calculation submodule, configured to calculate a loss function value of the initial traffic sign boundary point recognition model based on the prediction update boundary point and the sample update boundary point; and a parameter adjusting submodule, configured to adjust the parameter of the initial traffic sign boundary point recognition model by the loss function value.

In some embodiments, the apparatus includes a sample update boundary point acquisition unit, configured to acquire the sample update boundary point, the sample update boundary point acquisition unit includes an initial random point selection subunit, configured to select a set number of initial random points from the sample image; an update random point selection subunit, configured to select at least one update random point belonging to the traffic sign image segmentation area from the initial random points; and a sample update boundary point setting subunit, configured to calculate a distance between an update random point in the at least one update random point and the sample initial boundary point, and set an update random point having a smallest distance as the sample update boundary point.

In the third aspect, the embodiments of the present disclosure provides an electronic device, including: one or more processors; and a storage apparatus, storing one or more programs thereon, the one or more programs, when executed by the one or more processors, cause the one or more processors to implement the method according to the method for recognizing a boundary of a traffic sign according to the first aspect.

In the fourth aspect, the embodiments of the present disclosure provides a computer-readable medium, storing a computer program thereon, the program, when executed by a processor, implements the method for recognizing a boundary of a traffic sign according to the first aspect.

The method and apparatus for recognizing a boundary of a traffic sign provided by the embodiment of the present disclosure first obtains at least one initial boundary point of the traffic sign in a to-be-processed image; based on the at least one initial boundary point, divides the to-be-processed image into at least one image segmentation region; then, imports the image segmentation region into a pre-trained traffic sign boundary point recognition model to obtain an update boundary point corresponding to the image segmentation area; and finally, determines the boundary point of the traffic sign based on all the update boundary point corresponding to the image segmentation area. According to the embodiments of the disclosure, the accuracy of recognizing the boundary of traffic signs is improved.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
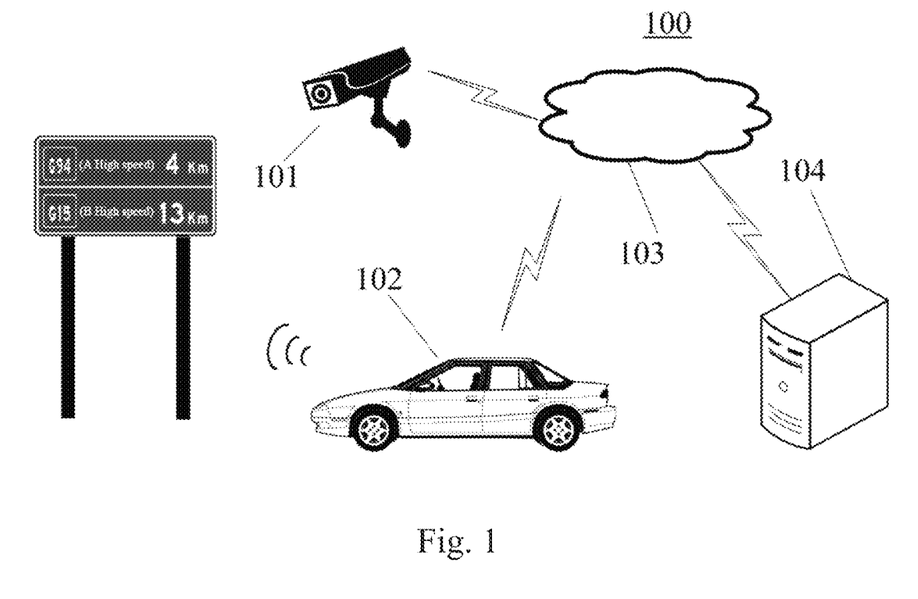
FIG. 1 is a diagram of an example system architecture in which some embodiments of the present disclosure may be implemented.

FIG. 1 illustrates an example system architecture 100 of a method for recognizing a boundary of a traffic sign or an apparatus for recognizing a boundary of a traffic sign in which some embodiments of the present disclosure may be implemented.

As shown in FIG. 1, the system architecture 100 may include image acquisition apparatuses 101 and 102, a network 103, and a server 104. The network 103 is used to provide a communication link medium between the image acquisition apparatuses 101 and 102 and the server 104. The network 103 may include various types of connections, such as wired, wireless communication links, or optic fibers.

The image acquisition apparatuses 101, 102 interact with the server 104 via the network 103 to receive or send messages and the like. Various data processing applications such as image acquisition applications, traffic sign recognition applications, data transmission applications, or alarm applications may be installed on the image acquisition apparatuses 101 and 102.

The image acquisition apparatuses 101 and 102 may be various vehicles having a plurality of data acquisition units and data processing units including, but not limited to, surveillance camera, vehicle camera, and the like.

The server 104 may be a server that provides various services, such as a server that performs image processing on a to-be-processed image including a traffic sign sent by the image acquisition apparatuses 101, 102. The server may process such as analyze received data such as the to-be-processed image, and obtain a processing result (for example, an update boundary point of the traffic sign).

It should be noted that the method for recognizing a boundary of a traffic sign provided by the embodiments of the present disclosure may be performed by the image acquisition apparatuses 101 and 102 alone or by the image acquisition apparatuses 101 and 102 together with the server 104. Accordingly, the apparatus for recognizing a boundary of a traffic sign may be disposed in the image acquisition apparatuses 101 and 102, or may be disposed in the server 104.

It should be noted that the server may be hardware or software. When the server is hardware, the server may be implemented as a distributed server cluster composed of a plurality of servers, or may be implemented as a single server. When the server is software, the server may be implemented as a plurality of software or software modules (for example, for providing distributed services), or as a single software or software module, which is not specifically limited herein.

It should be understood that the number of image acquisition apparatuses, networks and servers in FIG. 1 is merely illustrative. Depending on the implementation needs, there may be any number of image acquisition apparatuses, networks and servers.

Figure 2:
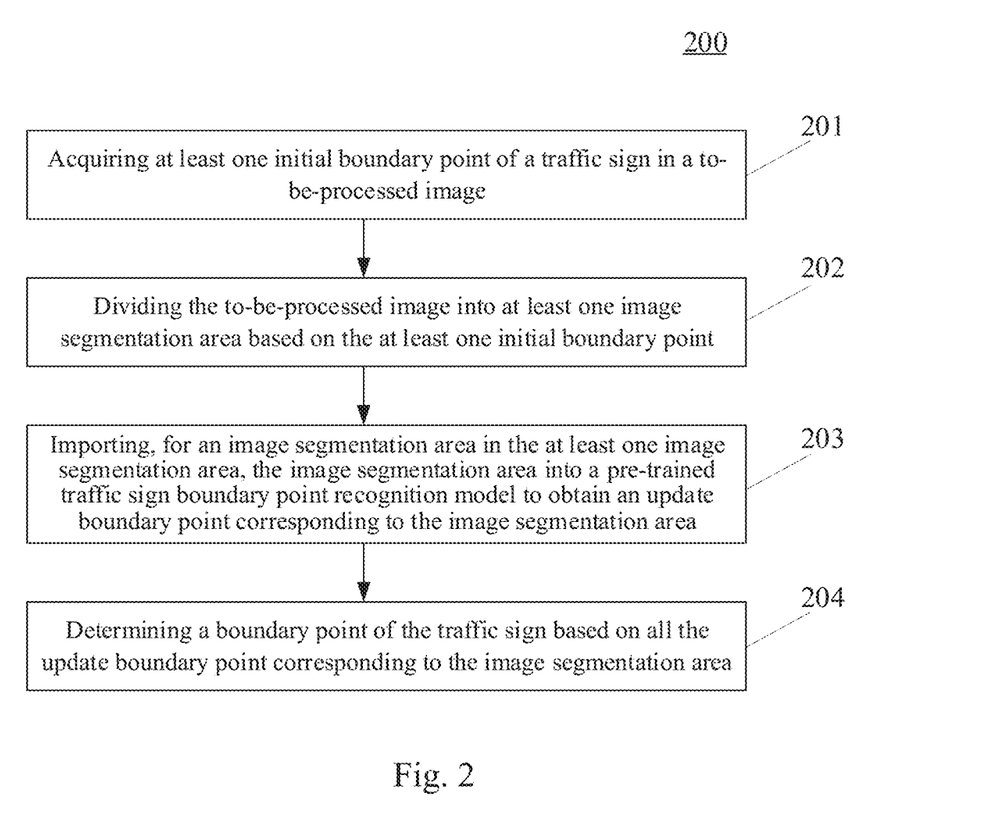
FIG. 2 is a flowchart of a method for recognizing a boundary of a traffic sign according to some embodiments of the present disclosure.

With further reference to FIG. 2, a flow 200 of a method for recognizing a boundary of a traffic sign according to some embodiments of the present disclosure is illustrated. The method for recognizing a boundary of a traffic sign includes the following steps 201 to 204.

Step 201 includes acquiring at least one initial boundary point of a traffic sign in a to-be-processed image.

In the present embodiment, an executing body of the method for recognizing a boundary of a traffic sign (for example, the image acquisition apparatuses 101, 102 and/or the server 104 shown in FIG. 1) may acquire the to-be-processed image through a wired connection or a wireless connection. The to-be-processed image may be a road image including a traffic sign. The to-be-processed image may be acquired by the image acquisition apparatuses 101, 102, or may be received from other terminal devices (for example, may be a traffic surveillance camera). It should be noted that the above wireless connection method may include but is not limited to 3G/4G connection, Wi-Fi connection, Bluetooth connection, WiMAX connection, Zigbee connection, UWB (Ultra Wideband) connection, and other wireless connection methods that are now known or to-be-developed in the future.

When recognizing a traffic sign in the existing technology, the recognition is usually affected by factors such as light, and it is difficult to acquire an accurate boundary point of the traffic sign. To this end, the executing body of the present disclosure may acquire the at least one initial boundary point of the traffic sign in the to-be-processed image in various methods (for example, various existing image recognition networks). The initial boundary point is marked on the to-be-processed image and is used to mark the boundary of the traffic sign. The initial boundary point generally belongs to an image point outside a traffic sign image. Generally, there is an offset between the initial boundary point and an actual boundary point of the traffic sign.

Step 202 includes dividing the to-be-processed image into at least one image segmentation area based on the at least one initial boundary point.

For traffic signs of different structures, the number of initial boundary points may be different. The executing body may divide the to-be-processed image into the at least one image segmentation area according to the structure of the traffic sign. Here, the image segmentation area may include at least one initial boundary point. The image segmentation area may be rectangular, triangular or other shape depending on actual needs.

Step 203 includes importing, for an image segmentation area in the at least one image segmentation area, the image segmentation area into a pre-trained traffic sign boundary point recognition model to obtain an update boundary point corresponding to the image segmentation area. Then, an accurate boundary of the traffic sign may be determined based on the update boundary point.

Then, the executing body may import the image segmentation area into the traffic sign boundary point recognition model to obtain the update boundary point corresponding to the image segmentation area. Here, the traffic sign boundary point recognition model may be used to obtain an update boundary point of the traffic sign based on the initial boundary point.

In some alternative implementations of the present embodiment, the traffic sign boundary point recognition model is obtained by the following two training steps.

The first step includes: acquiring a plurality of sample images and a sample update boundary point of a traffic sign corresponding to each sample image of the plurality of sample images.

In order to train the traffic sign boundary point recognition model, the executing body may first acquire the plurality of sample images and the sample update boundary point of the traffic sign corresponding to each sample image of the plurality of sample images. The sample image may include a traffic sign image segmentation area and a sample initial boundary point corresponding to the traffic sign image segmentation area.

The second step includes using each sample image of the plurality of sample images as an input, and using the sample update boundary point corresponding to each sample image of the plurality of sample images as an output, training to obtain the traffic sign boundary point recognition model.

In order to train the traffic sign boundary point recognition model, the executing body may use each sample image of the plurality of sample images as the input, and use the sample update boundary point corresponding to each sample image of the plurality of sample images as the output, to perform training to obtain the traffic sign boundary point recognition model.

In some alternative implementations of the present embodiment, the sample update boundary point is acquired by the following third steps.

The first step includes: selecting a set number of initial random points from the sample image.

In order to acquire the accurate boundary point of the traffic sign, the executing body may select the set number of initial random points from the sample image by random selection or other methods. The initial random point may be indicated by coordinate points on the sample image.

The second step includes selecting at least one update random point belonging to the traffic sign image segmentation area from the initial random points.

The sample image may include the traffic sign image segmentation area and a non-traffic-sign image segmentation area. Therefore, the initial random point may belong to the traffic sign image segmentation area in the sample image, or may not belong to the traffic sign image segmentation area. In order to determine the boundary of the traffic sign, the executing body may select the at least one update random point belonging to the traffic sign image segmentation area from the initial random points. The executing body may determine the update random point by a way of determining whether the pixel color corresponding to the initial random point belongs to the traffic sign image segmentation area or the like.

The third step includes calculating a distance between an update random point in the at least one update random point and the sample initial boundary point, and setting an update random point having the smallest distance as the sample update boundary point.

The executing body may calculate the distance between the update random point in the at least one update random point and the sample initial boundary point by a coordinate difference method or the like. Since the update random point belongs to the traffic sign image segmentation area, and the initial boundary point usually belongs to an image point outside a traffic sign, a point closer to the traffic sign in the traffic sign image may be acquired using the distance between the update random point and the sample initial boundary point. Therefore, the executing body may set the update random point having the smallest distance as the sample update boundary point.

In order to acquire a more accurate sample update boundary point, the executing body may use the sample update boundary point as a boundary, further acquire an initial random point between the sample update boundary point and the sample initial boundary point, and perform the above steps for multiple times to improve the accuracy of the sample update boundary point.

Step 204 includes determining a boundary point of the traffic sign based on all the update boundary point corresponding to the image segmentation area.

The executing body may use a point corresponding to the update boundary point on the to-be-processed image as the boundary point of the traffic sign based on the position of the update boundary point in the image segmentation area, thereby realizing accurate recognition of the traffic sign.

Figure 3:
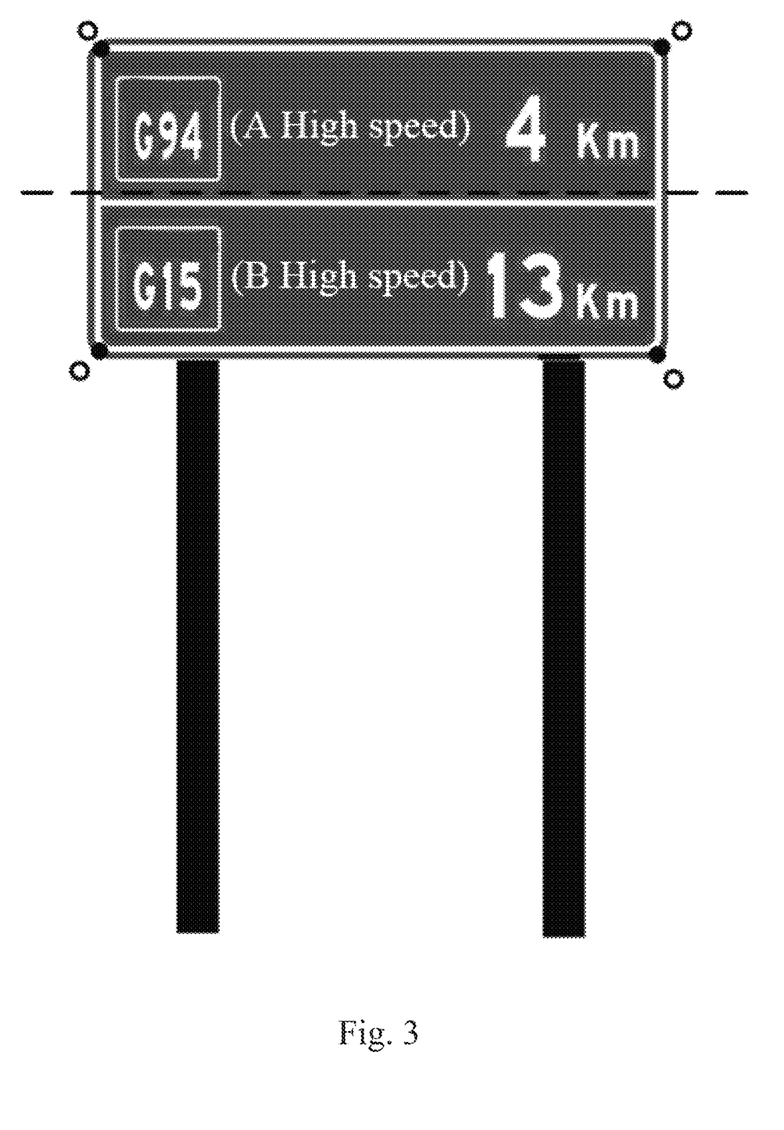
FIG. 3 is a schematic diagram of an application scenario of the method for recognizing a boundary of a traffic sign according to some embodiments of the present disclosure.

With further reference to FIG. 3, FIG. 3 is a schematic diagram of an application scenario of the method for recognizing a boundary of a traffic sign according to the present embodiment. In the application scenario of FIG. 3, the executing body (for example, the image acquisition apparatus 101 shown in FIG. 1) first acquires four initial boundary points of a traffic sign in a to-be-processed image (for example, the hollow dot in FIG. 3); then, the executing body may divide the to-be-processed image into upper and lower image segmentation areas by using the dotted line in FIG. 3; afterwards, the executing body may respectively input the upper and lower image segmentation areas into a traffic sign boundary point recognition model to obtain update boundary points corresponding to the image segmentation area; and finally, the update boundary points are marked on the to-be-processed image (for example, the solid dot in FIG. 3).

The method provided by the above embodiments of the present disclosure first acquires at least one initial boundary point of a traffic sign in a to-be-processed image; then divides the to-be-processed image into at least one image segmentation area based on the at least one initial boundary point; then imports the image segmentation area into a pre-trained traffic sign boundary point recognition model to obtain an update boundary point corresponding to the image segmentation area; and finally determines a boundary point of the traffic sign based on all the update boundary point corresponding to the image segmentation area. The present disclosure improves the accuracy of recognizing the boundary of a traffic sign.

Figure 4:
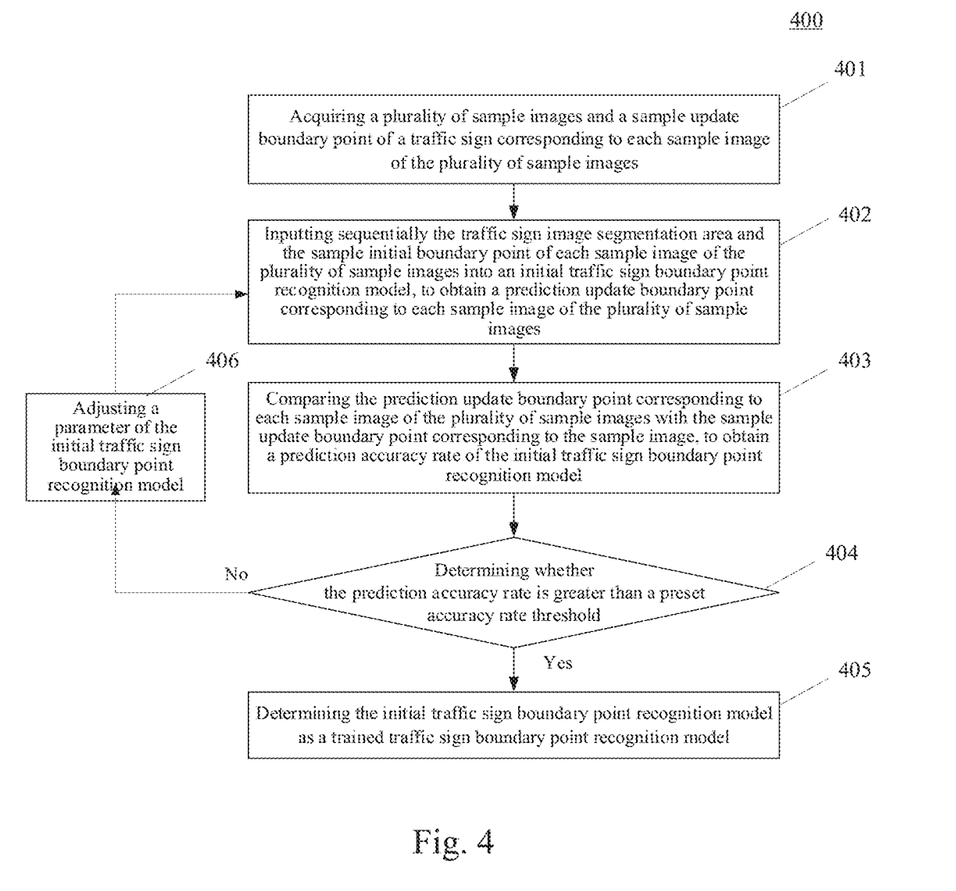
FIG. 4 is a flowchart of a method for training a traffic sign boundary point recognition model according to some embodiments of the present disclosure.

With further reference to FIG. 4, a flow 400 of a method for training a traffic sign boundary point recognition model according to some embodiments is illustrated. The flow 400 of the traffic sign boundary point recognition model training method includes the following steps 401 to 406.

Step 401 includes acquiring a plurality of sample images and a sample update boundary point of a traffic sign corresponding to each sample image of the plurality of sample images.

In the present embodiment, an executing body of the traffic sign boundary point recognition model training method (for example, the server 104 shown in FIG. 1) may acquire the plurality of sample images and the sample update boundary point of the traffic sign corresponding to each sample image of the plurality of sample images.

Step 402 includes inputting sequentially the traffic sign image segmentation area and the sample initial boundary point of each sample image of the plurality of sample images into an initial traffic sign boundary point recognition model, to obtain a prediction update boundary point corresponding to each sample image of the plurality of sample images.

In the present embodiment, based on the plurality of sample images acquired in step 401, the executing body may input sequentially the traffic sign image segmentation area and the sample initial boundary point of each sample image of the plurality of sample images into the initial traffic sign boundary point recognition model, thereby obtaining the prediction update boundary point corresponding to each sample image of the plurality of sample images. Here, the executing body may input each sample image from an input side of the initial traffic sign boundary point recognition model, process the sample image sequentially through the parameters of the layers in the initial traffic sign boundary point recognition model, and output the sample image from an output side of the initial traffic sign boundary point recognition model. The information outputted from the output side is the prediction update boundary point corresponding to the sample image. The initial traffic sign boundary point recognition model may be an untrained model (for example, a deep learning model, etc.) or a model with unfinished training, and the layers are provided with initialization parameters, and the initialization parameters may be continuously adjusted during the training process of the model.

Step 403 includes comparing the prediction update boundary point corresponding to each sample image of the plurality of sample images with the sample update boundary point corresponding to the sample image, to obtain a prediction accuracy rate of the initial traffic sign boundary point recognition model.

Based on the prediction update boundary point corresponding to each sample image of the plurality of sample images obtained in step 402, the executing body may compare the prediction update boundary point corresponding to each sample image of the plurality of sample images with the sample update boundary point corresponding to the sample image, thereby obtaining the prediction accuracy rate of the initial traffic sign boundary point recognition model. Specifically, if the prediction update boundary point corresponding to a sample image is the same as or close to the sample update boundary point corresponding to the sample image, the initial traffic sign boundary point recognition model predicts correctly; and if the prediction update boundary point corresponding to a sample image is not the same as or close to the sample update boundary point corresponding to the sample image, the initial traffic sign boundary point recognition model predicts wrong. Here, the executing body may calculate the ratio of the number of correct predictions to the total number of samples, and use the ratio as the prediction accuracy rate of the initial traffic sign boundary point recognition model.

Step 404 includes determining whether the prediction accuracy rate is greater than a preset accuracy rate threshold.

Based on the prediction accuracy rate of the initial traffic sign boundary point recognition model obtained in step 403, the executing body may compare the prediction accuracy rate of the initial traffic sign boundary point recognition model with the preset accuracy rate threshold. If the prediction accuracy rate is greater than the preset accuracy rate threshold, step 405 is performed; and if the prediction accuracy rate is not greater than the preset accuracy rate threshold, step 406 is performed.

Step 405 includes determining the initial traffic sign boundary point recognition model as a trained traffic sign boundary point recognition model.

In the present embodiment, when the prediction accuracy rate of the initial traffic sign boundary point recognition model is greater than the preset accuracy rate threshold, it is indicated that the training of the initial traffic sign boundary point recognition model is finished, and in this case, the executing body may determine the initial traffic sign boundary point recognition model as the trained traffic sign boundary point recognition model.

Step 406 includes adjusting a parameter of the initial traffic sign boundary point recognition model.

In the present embodiment, when the prediction accuracy rate of the initial traffic sign boundary point recognition model is not greater than the preset accuracy rate threshold, the executing body may adjust the parameter of the initial traffic sign boundary point recognition model, and return to perform step 402, until a traffic sign boundary point recognition model capable of acquiring an accurate traffic sign boundary point is trained.

In some alternative implementations of the present embodiment, the adjusting a parameter of the initial traffic sign boundary point recognition model may include the following two steps.

The first step includes: calculating a loss function value of the initial traffic sign boundary point recognition model based on the prediction update boundary point and the sample update boundary point.

In order to acquire a more accurate result, the initial traffic sign boundary point recognition model is provided with a loss function. The executing body may calculate the position difference between the prediction update boundary point and the sample update boundary point, and set the position difference as the loss function value of the loss function.

The second step includes adjusting the parameter of the initial traffic sign boundary point recognition model by the loss function value.

The executing body may adjust the parameter of the initial traffic sign boundary point recognition model based on the loss function value, to improve the accuracy of an output result of the initial traffic sign boundary point recognition model.

Figure 5:
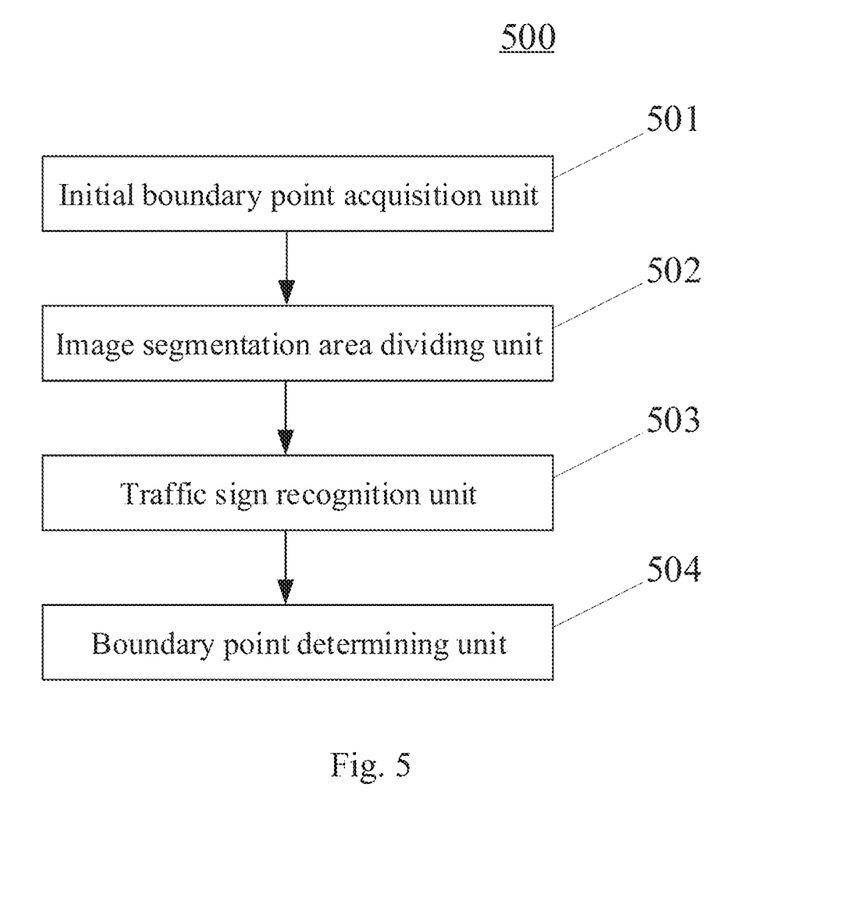
FIG. 5 is a schematic structural diagram of an apparatus for recognizing a boundary of a traffic sign according to some embodiments of the present disclosure.

With further reference to FIG. 5, as an implementation of the method shown in the above figures, the present disclosure provides an embodiment of an apparatus for recognizing a boundary of a traffic sign, and the apparatus embodiment corresponds to the method embodiment as shown in FIG. 2. The apparatus may be specifically applied to various electronic devices.

As shown in FIG. 5, an apparatus 500 for recognizing a boundary of a traffic sign of the present embodiment may include: an initial boundary point acquisition unit 501, an image segmentation area dividing unit 502, a traffic sign recognition unit 503 and a boundary point determining unit 504. The initial boundary point acquisition unit 501 is configured to acquire at least one initial boundary point of a traffic sign in a to-be-processed image, the initial boundary point being used to mark a boundary of the traffic sign. The image segmentation area dividing unit 502 is configured to divide the to-be-processed image into at least one image segmentation area based on the at least one initial boundary point, the image segmentation area including at least one initial boundary point. The traffic sign recognition unit 503 is configured to import, for an image segmentation area in the at least one image segmentation area, the image segmentation area into a pre-trained traffic sign boundary point recognition model to obtain an update boundary point corresponding to the image segmentation area, the traffic sign boundary point recognition model being configured to obtain an update boundary point of the traffic sign based on the initial boundary point. The boundary point determining unit 504 is configured to determine a boundary point of the traffic sign based on all the update boundary point corresponding to the image segmentation area.

In some alternative implementations of the present embodiment, the apparatus 500 for recognizing a boundary of a traffic sign may include a traffic sign boundary point recognition model training unit (not shown in the figure), configured to train the traffic sign boundary point recognition model, and the traffic sign boundary point recognition model training unit may include: a sample acquisition subunit (not shown in the figure) and a traffic sign boundary point recognition model training subunit (not shown in the figure). The sample acquisition subunit is configured to acquire a plurality of sample images and a sample update boundary point of a traffic sign corresponding to each sample image of the plurality of sample images, where the sample image includes a traffic sign image segmentation area and a sample initial boundary point corresponding to the traffic sign image segmentation area. The traffic sign boundary point recognition model training subunit is configured to use each sample image of the plurality of sample images as an input, and use the sample update boundary point corresponding to each sample image of the plurality of sample images as an output, to perform training to obtain the traffic sign boundary point recognition model.

In some alternative implementations of the present embodiment, the traffic sign boundary point recognition model training subunit may include: a traffic sign boundary point recognition model training module (not shown in the figure), configured to input sequentially the traffic sign image segmentation area and the sample initial boundary point of each sample image of the plurality of sample images into an initial traffic sign boundary point recognition model, to obtain a prediction update boundary point corresponding to each sample image of the plurality of sample images, compare the prediction update boundary point corresponding to each sample image of the plurality of sample images with the sample update boundary point corresponding to the sample image, to obtain a prediction accuracy rate of the initial traffic sign boundary point recognition model, determine whether the prediction accuracy rate is greater than a preset accuracy rate threshold, and if the prediction accuracy rate is greater than the preset accuracy rate threshold, determine the initial traffic sign boundary point recognition model as a trained traffic sign boundary point recognition model.

In some alternative implementations of the present embodiment, the traffic sign boundary point recognition model training subunit may include: a parameter adjusting module (not shown in the figure), configured to adjust a parameter of the initial traffic sign boundary point recognition model, in response to the prediction accuracy rate being not greater than the preset accuracy rate threshold, and return to the traffic sign boundary point recognition model training module.

In some alternative implementations of the present embodiment, the parameter adjusting module may include: a loss function value calculation submodule (not shown in the figure) and a parameter adjusting submodule (not shown in the figure). The loss function value calculation submodule is configured to calculate a loss function value of the initial traffic sign boundary point recognition model based on the prediction update boundary point and the sample update boundary point. The parameter adjusting submodule is configured to adjust the parameter of the initial traffic sign boundary point recognition model by the loss function value.

In some alternative implementations of the present embodiment, the apparatus 500 for recognizing a boundary of a traffic sign may include a sample update boundary point acquisition unit (not shown in the figure), configured to acquire the sample update boundary point. The sample update boundary point acquisition unit may include: an initial random point selection subunit (not shown in the figure), an update random point selection subunit (not shown in the figure) and a sample update boundary point setting subunit (not shown in the figure). The initial random point selection subunit is configured to select a set number of initial random points from the sample image. The update random point selection subunit is configured to select at least one update random point belonging to the traffic sign image segmentation area from the initial random points. The sample update boundary point setting subunit is configured to calculate a distance between an update random point in the at least one update random point and the sample initial boundary point, and set an update random point having the smallest distance as the sample update boundary point.

The present embodiment further provides an electronic device, including: one or more processors; and a storage apparatus, storing one or more programs thereon, the one or more programs, when executed by the one or more processors, cause the one or more processors to implement the method for recognizing a boundary of a traffic sign.

The present embodiment further provides a computer readable medium, storing a computer program thereon, the program, when executed by a processor, implements the method for recognizing a boundary of a traffic sign.

Figure 6:
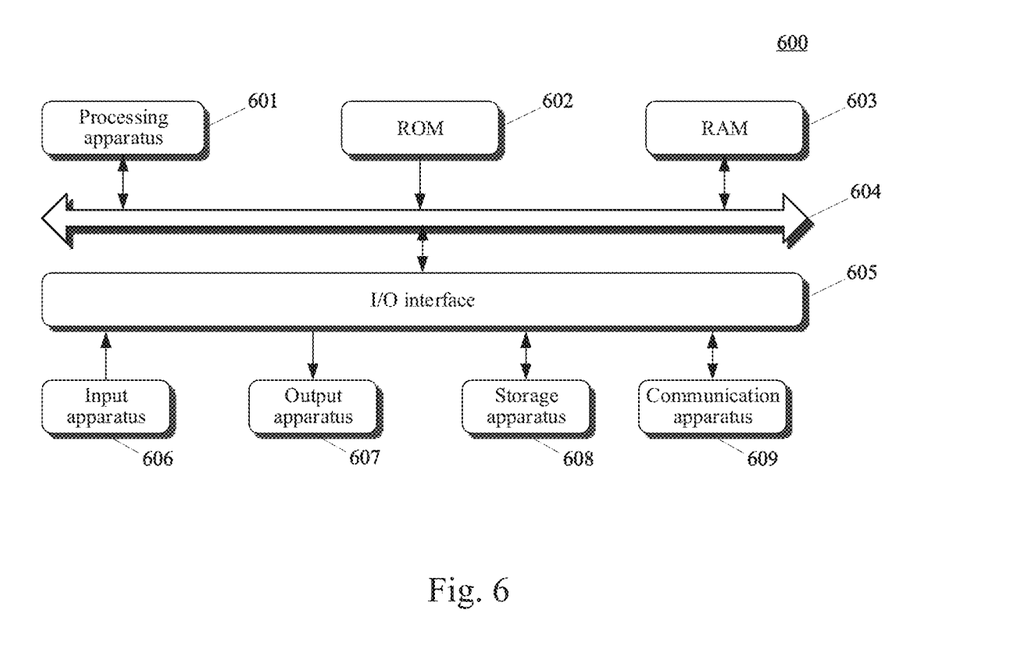
FIG. 6 is a schematic structural diagram of an electronic device adapted to implement the embodiments of the present disclosure.

With further reference to FIG. 6, a schematic structural diagram of a computer system 600 adapted to implement an electronic device (for example, the server 105 shown in FIG. 1) of the embodiments of the present disclosure is shown. The electronic device shown in FIG. 6 is merely an example, and should not impose any limitation on the function and scope of use of the embodiments of the present disclosure.

As shown in FIG. 6, the electronic device 600 may include a processing apparatus (e.g., a central processing unit, a graphics processor, etc.) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Generally, the following apparatuses may be connected to the I/O interface 605: an input apparatus 606 including, for example, a touch screen, a touch pad, a keyboard, a mouse, a camera, a microphone, an accelerometer, a gyroscope and the like; an output apparatus 607 including, for example, a liquid crystal display (LCD), a speaker, a vibrator and the like; a storage apparatus 608 including, for example, a magnetic tape, a hard disk and the like; and a communication apparatus 609. The communication apparatus 609 may allow the electronic device 600 to communicate in a wired or wireless connection with other devices to exchange data. Although FIG. 6 illustrates the electronic device 600 having various apparatuses, it should be understood that it is not required to implement or have all of the illustrated apparatuses. More or less apparatuses may be alternatively implemented or possessed. Each block shown in FIG. 6 may represent one apparatus or may represent a plurality of apparatuses as desired.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 609, installed from the storage apparatus 608, or from the ROM 602. The computer program, when executed by the processing apparatus 601, implements the above mentioned functionalities as defined in the method of the embodiments of the present disclosure.

It should be noted that the computer readable medium in the embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the embodiments of the present disclosure, the computer readable storage medium may be any physical medium containing or storing programs which may be used by a command execution system, apparatus or element or incorporated thereto. In the embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium including but not limited to: wired, optical cable, RF (radio frequency) and etc., or any suitable combination of the above.

The computer readable medium may be included in the above electronic device, or a stand-alone computer readable medium not assembled into the electronic device. The computer readable medium stores one or more programs. The one or more programs, when executed by the electronic device, cause the electronic device to: acquire at least one initial boundary point of a traffic sign in a to-be-processed image, the initial boundary point being used to mark a boundary of the traffic sign; divide the to-be-processed image into at least one image segmentation area based on the at least one initial boundary point, the image segmentation area including at least one initial boundary point; import, for an image segmentation area in the at least one image segmentation area, the image segmentation area into a pre-trained traffic sign boundary point recognition model to obtain an update boundary point corresponding to the image segmentation area, the traffic sign boundary point recognition model being configured to obtain an update boundary point of the traffic sign based on the initial boundary point; and determine a boundary point of the traffic sign based on all the update boundary point corresponding to the image segmentation area.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including an initial boundary point acquisition unit, an image segmentation area dividing unit, a traffic sign recognition unit and a boundary point determining unit. Here, the names of these units do not in some cases constitute limitations to such units themselves. For example, the traffic sign recognition unit may also be described as "a unit configured to determine an update boundary point through the image segmentation area".

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for recognizing a boundary of a traffic sign, the method comprising:

acquiring at least one initial boundary point of the traffic sign in a to-be-processed image, the initial boundary point being used to mark the boundary of the traffic sign;

dividing the to-be-processed image into at least one image segmentation area based on the at least one initial boundary point, the image segmentation area including the at least one initial boundary point;

importing, for an image segmentation area in the at least one image segmentation area, the image segmentation area into a pre-trained traffic sign boundary point recognition model to obtain an update boundary point corresponding to the image segmentation area, the traffic sign boundary point recognition model being configured to obtain the update boundary point of the traffic sign based on the initial boundary point; and determining the boundary point of the traffic sign based on all the update boundary point corresponding to the image segmentation area.

2. The method according to claim 1, wherein the traffic sign boundary point recognition model is obtained by following training steps:

acquiring a plurality of sample images and a sample update boundary point of a traffic sign corresponding to each sample image of the plurality of sample images, wherein the sample image includes a traffic sign image segmentation area and a sample initial boundary point corresponding to the traffic sign image segmentation area; and using each sample image of the plurality of sample images as an input, and using the sample update boundary point corresponding to each sample image of the plurality of sample images as an output, to perform training to obtain the traffic sign boundary point recognition model.

3. The method according to claim 2, wherein the using each sample image of the plurality of sample images as an input, and using the sample update boundary point corresponding to each sample image of the plurality of sample images as an output, to perform training to obtain the traffic sign boundary point recognition model, comprises:

performing following training steps: inputting sequentially the traffic sign image segmentation area and the sample initial boundary point of each sample image of the plurality of sample images into an initial traffic sign boundary point recognition model, to obtain a prediction update boundary point corresponding to each sample image of the plurality of sample images, comparing the prediction update boundary point corresponding to each sample image of the plurality of sample images with the sample update boundary point corresponding to the sample image, to obtain a prediction accuracy rate of the initial traffic sign boundary point recognition model, determining whether the prediction accuracy rate is greater than a preset accuracy rate threshold, and if the prediction accuracy rate is greater than the preset accuracy rate threshold, determining the initial traffic sign boundary point recognition model as a trained traffic sign boundary point recognition model.

4. The method according to claim 3, wherein the using each sample image of the plurality of sample images as an input, and using the sample update boundary point corresponding to each sample image of the plurality of sample images as an output, to perform training to obtain the traffic sign boundary point recognition model, comprises:

adjusting a parameter of the initial traffic sign boundary point recognition model, in response to the prediction accuracy rate being not greater than the preset accuracy rate threshold, and continuing to perform the training steps.

5. The method according to claim 4, wherein the adjusting a parameter of the initial traffic sign boundary point recognition model, comprises:

calculating a loss function value of the initial traffic sign boundary point recognition model based on the prediction update boundary point and the sample update boundary point; and adjusting the parameter of the initial traffic sign boundary point recognition model by the loss function value.

6. The method according to claim 2, wherein the sample update boundary point is acquired by following steps:

selecting a set number of initial random points from the sample image;

selecting at least one update random point belonging to the traffic sign image segmentation area from the initial random points; and calculating a distance between an update random point in the at least one update random point and the sample initial boundary point, and setting an update random point having the smallest distance as the sample update boundary point.

7. An apparatus for recognizing a boundary of a traffic sign, the apparatus comprising:

at least one processor; and a memory storing instructions, wherein the instructions when executed by the at least one processor, cause the at least one processor to perform operations, the operations comprising:

acquiring at least one initial boundary point of the traffic sign in a to-be-processed image, the initial boundary point being used to mark the boundary of the traffic sign;

dividing the to-be-processed image into at least one image segmentation area based on the at least one initial boundary point, the image segmentation area including at least one initial boundary point;

importing, for an image segmentation area in the at least one image segmentation area, the image segmentation area into a pre-trained traffic sign boundary point recognition model to obtain an update boundary point corresponding to the image segmentation area, the traffic sign boundary point recognition model being configured to obtain the update boundary point of the traffic sign based on the initial boundary point; and determining the boundary point of the traffic sign based on all the update boundary point corresponding to the image segmentation area.

8. The apparatus according to claim 7, wherein the traffic sign boundary point recognition model is obtained by following training steps:

acquiring a plurality of sample images and a sample update boundary point of a traffic sign corresponding to each sample image of the plurality of sample images, wherein the sample image includes a traffic sign image segmentation area and a sample initial boundary point corresponding to the traffic sign image segmentation area; and training to obtain the traffic sign boundary point recognition model, by using each sample image of the plurality of sample images as an input and using the sample update boundary point corresponding to each sample image of the plurality of sample images as an output.

9. The apparatus according to claim 8, wherein training to obtain the traffic sign boundary point recognition model, by using each sample image of the plurality of sample images as an input and using the sample update boundary point corresponding to each sample image of the plurality of sample images as an outputs:

inputting sequentially the traffic sign image segmentation area and the sample initial boundary point of each sample image of the plurality of sample images into an initial traffic sign boundary point recognition model, to obtain a prediction update boundary point corresponding to each sample image of the plurality of sample images, comparing the prediction update boundary point corresponding to each sample image of the plurality of sample images with the sample update boundary point corresponding to the sample image, to obtain a prediction accuracy rate of the initial traffic sign boundary point recognition model, determining whether the prediction accuracy rate is greater than a preset accuracy rate threshold, and if the prediction accuracy rate is greater than the preset accuracy rate threshold, determining the initial traffic sign boundary point recognition model as a trained traffic sign boundary point recognition model.

10. The apparatus according to claim 9, wherein the training to obtain the traffic sign boundary point recognition model, by using each sample image of the plurality of sample images as an input and using the sample update boundary point corresponding to each sample image of the plurality of sample images as an output:

adjusting a parameter of the initial traffic sign boundary point recognition model, in response to the prediction accuracy rate being not greater than the preset accuracy rate threshold, and return to the traffic sign boundary point recognition model training module.

11. The apparatus according to claim 10, wherein the adjusting a parameter of the initial traffic sign boundary point recognition model, comprises:

calculating a loss function value of the initial traffic sign boundary point recognition model based on the prediction update boundary point and the sample update boundary point; and adjusting the parameter of the initial traffic sign boundary point recognition model by the loss function value.

12. The apparatus according to claim 8, wherein the sample update boundary point is acquired by following steps:

selecting a set number of initial random points from the sample image;

selecting at least one update random point belonging to the traffic sign image segmentation area from the initial random points; and calculating a distance between an update random point in the at least one update random point and the sample initial boundary point, and setting an update random point having a smallest distance as the sample update boundary point.

13. A non-transitory computer readable medium, storing a computer program thereon, the program, when executed by a processor, causes the processor to perform operations, the operations comprising:

acquiring at least one initial boundary point of the traffic sign in a to-be-processed image, the initial boundary point being used to mark the boundary of the traffic sign;

dividing the to-be-processed image into at least one image segmentation area based on the at least one initial boundary point, the image segmentation area including the at least one initial boundary point;

importing, for an image segmentation area in the at least one image segmentation area, the image segmentation area into a pre-trained traffic sign boundary point recognition model to obtain an update boundary point corresponding to the image segmentation area, the traffic sign boundary point recognition model being configured to obtain the update boundary point of the traffic sign based on the initial boundary point; and determining the boundary point of the traffic sign based on all the update boundary point corresponding to the image segmentation area.

\* \* \* \* \*